March 15, 1938.  A. Y. DODGE  2,111,281
POWER CONTROL MECHANISM
Filed March 8, 1934  2 Sheets-Sheet 1
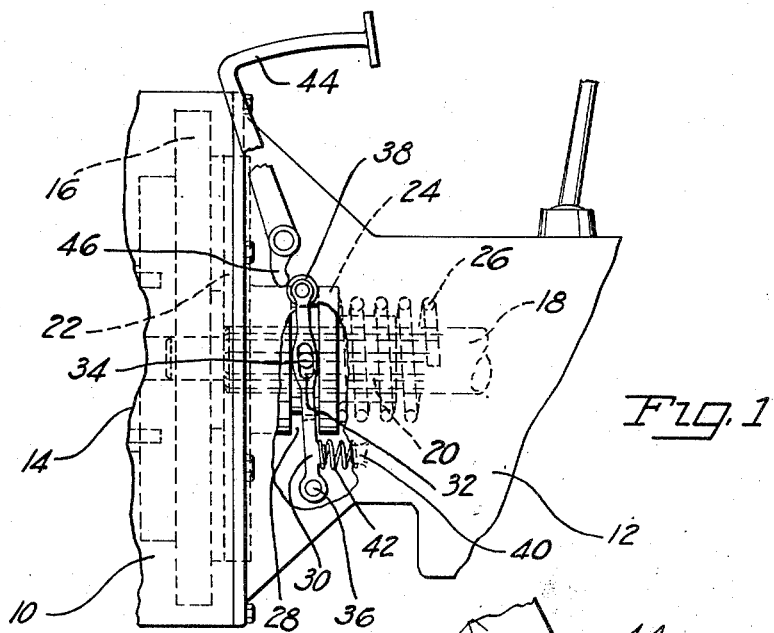
Fig.1
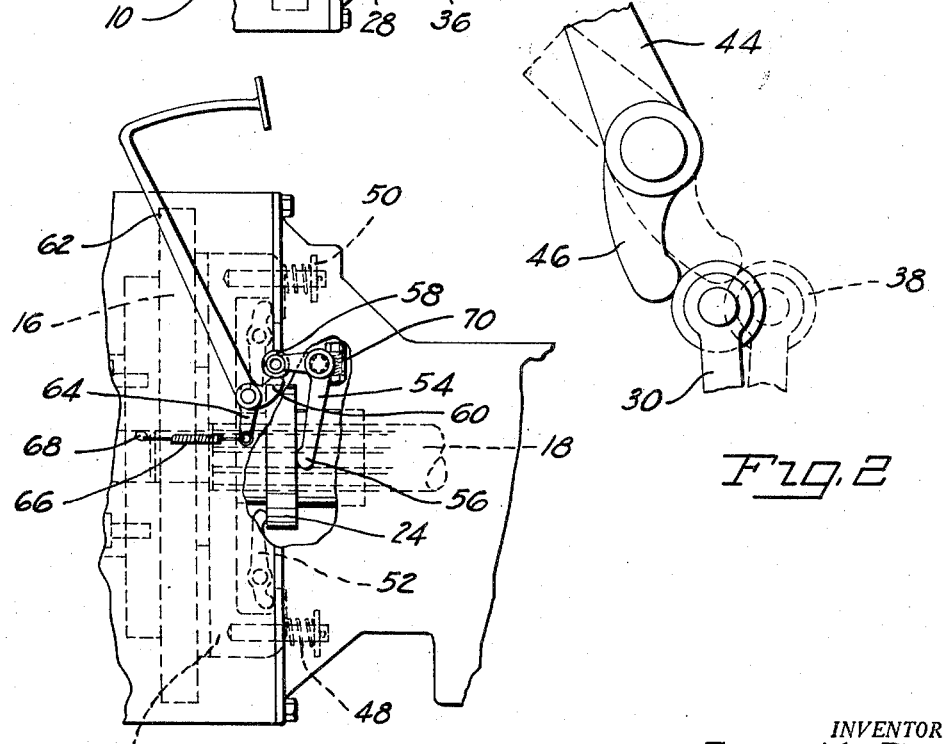
Fig.2
Fig.3
INVENTOR.
ADIEL Y. DODGE
BY
ATTORNEY

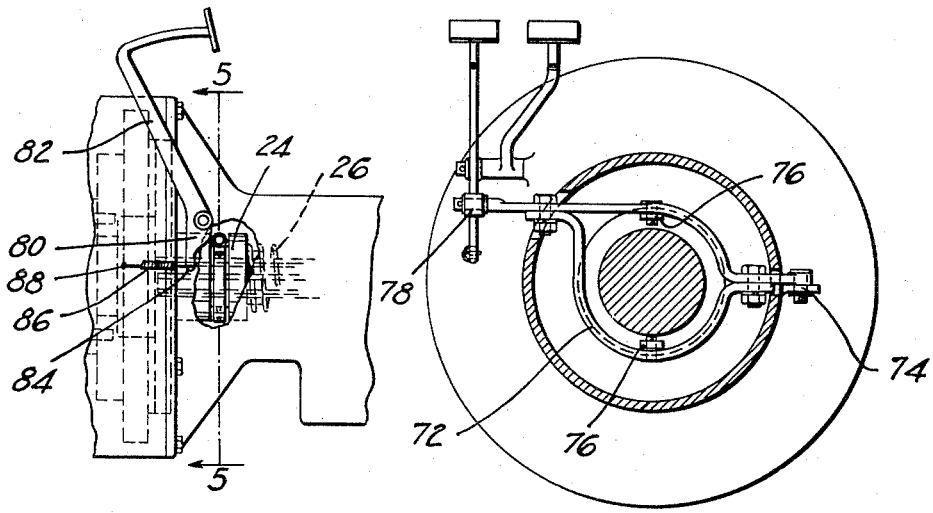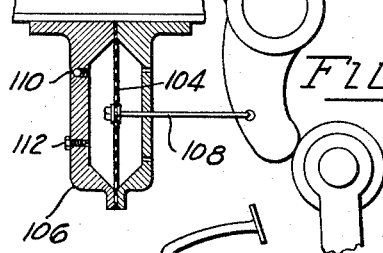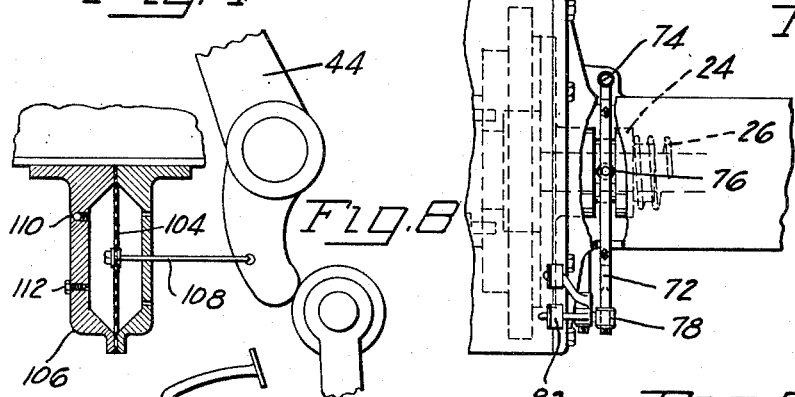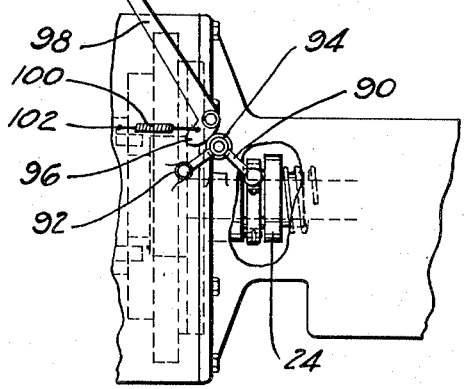

Patented Mar. 15, 1938

2,111,281

UNITED STATES PATENT OFFICE 2,111,281

POWER CONTROL MECHANISM

Adiel Y. Dodge, South Bend, Ind., assignor to Bendix Aviation Corporation, South Bend, Ind., a corporation of Delaware Application March 8, 1934, Serial No. 714,676

3 Claims. (Cl. 192—99)

This invention relates to clutches, and more particularly to manually operable means for controlling the clutch.

Broadly, the invention comprehends a control of a clutch of a motor vehicle which will require a minimum of effort to disengage the clutch. It is the principal object of the present invention to provide an efficient and dependable clutch control mechanism requiring approximately a uniform pressure on the pedal when separating the driving and driven elements of the clutch and a progressively decreasing pressure after said separation, the same falling off to a point where the pressure to maintain the clutch disengaged requires approximately the weight of a person's foot resting on the floor board. The invention also contemplates the provision of a clutch control mechanism which may be easily adjusted to compensate for clutch wear, which is positive in action, and which will not become locked to the off position.

A feature of the invention is a clutch operating pedal having a cam surface arranged to engage an operating member, so that the required pressure on the pedal for operating the member will be uniform throughout the stroke of the pedal until the cam has passed the dead center, the parts being so proportioned that the clutch is at this time just disengaged, the cam surface being further shaped so that the required pedal pressure throughout the remainder of the stroke progressively decreases.

A further object of the invention is to provide a clutch operating mechanism, whereby the clutch may be disengaged and held disengaged with a minimum of physical effort, together with means operative to insure a regulated engagement of the clutch in the event the driver should inadvertently release the clutch pedal too suddenly, or should his foot accidently slip off the clutch pedal while holding the same disengaged.

Other objects and features of the invention will appear from the following description taken in connection with the drawings, which form a part of this specification, and in which:

Figure 1 is a side elevation of a clutch housing broken away to better illustrate the invention;

Figure 2 is an enlarged detail view of the operating lever and clutch control lever members of the embodiment disclosed in Figure 1;

Figure 3 is a side elevation of a clutch housing, partly broken away, illustrating a modified form of the invention;

Figure 4 is a view similar to that of Figure 3 illustrating a further modification;

Figure 5 is a sectional view substantially on line 5—5 of Figure 4;

Figure 6 is a top plan view of the structure shown in Figure 4;

Figure 7 is a further modification illustrating the invention; and

Figure 8 is a view disclosing means, supplementing the manually operated means, for holding the clutch disengaged and operative to control the engagement of the clutch.

Referring to the drawings illustrating the invention in detail, 10 represents a clutch housing bolted or otherwise secured to a transmission housing 12. The clutch housing has positioned therein a driving shaft 14 to which is keyed or otherwise secured a flywheel 16 constituting the driving element of a friction clutch. Journalled in the end of the driving shaft is a driven shaft 18, the latter being splined as indicated at 20, and positioned for movement on the splines is a conventional clutch driven element 22 adaptable for cooperation with the flywheel, when the clutch is engaged. The driven shaft has positioned thereon a collar 24 in direct thrust engagement with the clutch member 22, the collar being normally thrust against the member 22 by a suitable clutch spring 26 sleeved on the driven shaft 18. As shown, the collar 24 is provided with a circumferential groove 28 in which is slidably pivoted a lever 30, the latter being provided with a slot 32 receiving a trunnion pin 34. This lever has one end pivoted on the crank case as indicated at 36, and the free end of the lever has mounted thereon a roller bearing 38. Interposed between the lever and a suitable stop 40 on the crank case is an auxiliary spring 42 to take the weight of the pedal off of the throw-out bearing provided by the slot 32. Pivoted on the crank case is a clutch pedal lever 44 having a cam 46 adaptable for cooperation with the roller bearing 38 on the lever 30.

In the embodiment of the invention shown in Figure 3, the clutch member 22 is normally held in engagement with the flywheel 16 by a plurality of springs 48 interposed between the member 22 and suitable brackets 50 on the clutch housing. In this modification the collar 24 is moved against actuating levers or so-called fingers 52 by a bell crank lever 54 pivoted on the clutch casing. This lever has one arm 56 in direct thrust engagement with the collar 24, and mounted on the end of the other arm of the bell crank lever is a roller 58 arranged for cooperation with a cam 60 on the pivoted end of a clutch pedal lever 62. The operating lever has a projection 64 connected by a suitable spring 66 to a fixed support 68 on the crank case. The angularity of the arm 56 is preferably adjustable by a worm 70 to compensate for clutch wear, the remaining arm of the lever maintaining a fixed position in the clutch disengaged position of the lever 62.

Figures 4, 5 and 6 illustrate a further modification of the invention. In this modification collar 24 is held in direct thrust engagement with the clutch driven member by the spring 26. The collar has a circumferential groove in which is positioned a yoke 72 pivoted on the clutch casing, as indicated at 74. Yoke 72 is constructed of two strap members shaped as disclosed in Figure 5 and housing between them the collar 24, rollers 76 being provided on the straps to contact the collar. The yoke has positioned thereon at its end a roller 78 adaptable for cooperation with a cam 80, on one arm of a clutch pedal lever 82. As shown, this arm is shaped to provide both the cam 80 and an extension 84, to which is attached a spring 86 connected to a fixed support 88 on the casing.

Still a further modification of the invention is illustrated in Figure 7 wherein the collar 24 is connected by a toggle 90 to a fixed support 92 on the clutch casing. The knee of the toggle has positioned thereon a roller 94 adaptable for cooperation with a cam 96 on one arm of a clutch pedal lever 98. The cam is connected by a suitable return spring 100 to a fixed support 102 on the casing.

In all of the disclosed embodiments the cam on the clutch pedal lever is so shaped and said lever, together with its cooperating levers, so constructed and arranged that a constant or substantially constant force is required to actuate the clutch pedal until the clutch plates are separated, and thereafter a progressively decreasing force is required to complete the throw of the pedal. This result is accomplished, inasmuch as the point of contact of cam 46 and roller 38 approaches a straight line drawn between the pivotal axis of the member 46 and the center of the roller. Expressed in other words, the lever members are so constructed and arranged that the perpendicular distance or moment arm, between the pivotal center of the clutch pedal lever and the line of movement of the aforementioned point of contact, remains a constant until the clutch plates are separated, whereupon said distance progressively changes to progressively decrease the force required to complete the throw of the pedal lever.

In both the preferred and modified forms of the invention the operation is substantially the same. It will be observed that with operation of the pedal lever the applied force is transmitted to the control member for actuating the collar to move the same either forwardly or rearwardly to disengage and engage the clutch and that, owing to the cooperation of these elements, there is required a very light pedal pressure to hold the clutch out of engagement. It will also be observed that the pressure required to operate the pedal is approximately uniform throughout the clutch disengaging stroke of the pedal.

It will further be observed that the pressure required to maintain the clutch disengaged is at a minimum at the end of the stroke, thus relieving the driver of considerable fatigue in the operation of the clutch in traffic.

It will further be observed that in the modification disclosed in Figure 3 the clutch arm 56 is so adjustable and so shaped at its end as to maintain an unvariable operation of the clutch operating mechanism irrespective of normal clutch wear.

There is disclosed in Figure 8 a further feature of the invention wherein the diaphragm 104 of a dashpot 106 is operatively connected by rod 108 to the lower arm of the clutch pedal 44 of the modification of Figures 1 and 2. The casing of the dashpot, which may be fixedly secured to any convenient portion of the chassis, is provided with an inwardly opening check valve 110 and an adjustable bleed valve 112. Should the driver, by virtue of the relatively small amount of physical effort necessary to maintain the clutch disengaged, release the clutch too suddenly or perchance should his foot accidentally slip off of the clutch pedal, the dashpot mechanism would nevertheless insure a regulated engagement of the clutch; this by virtue of the bleed of air from the valve 112. Thus the rate of engagement would be limited to a predetermined maximum speed. The one-way check valve 110, of course, permits an unobstructed manual disengagement of the clutch. The rate of clutch engaging movement of the clutch pedal would, by virtue of the heretofore described cam or lever structure, be variable to provide a relatively fast engagement of the clutch during the first phase of the throw of the clutch pedal and a relatively slow engagement when the clutch plates are in contact and moving into driving engagement. The dashpot of Figure 8 may be incorporated into any of the remaining embodiments of the invention.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. Clutch operating mechanism for an automotive clutch comprising driving and driven elements, and spring operated means acting on said driven element comprising, in combination, a lever member connected to said spring operated means, said member being provided with a roller at one of its ends, and a foot operated lever member provided with a cam at one of its ends contactible with said roller, said lever members, together with the remaining structure, being so constructed and arranged that to effect a disengagement of the clutch a constant or substantially constant force is required to operate said foot operated lever until the aforementioned driving and driven clutch elements are separated, and thereafter a progressively decreasing force is required to complete the throw of said foot operated lever member.

2. Clutch operating mechanism for an automotive clutch comprising driving and driven elements, and spring operating means acting on said driven element comprising, in combination, a two-part yoke member surrounding said spring operating means, and a manually operable lever member operatively connected to said yoke member, said lever member, together with the remaining structure, being so constructed and arranged that to effect a disengagement of the clutch a constant or substantially constant force is required to actuate said lever member until the aforementioned driving and driven clutch elements are separated, and thereafter a progressively decreasing force is required to complete the throw of said lever member.

3. Clutch operating mechanism for an automotive vehicle provided with a clutch having driving and driven elements, and yieldable means normally urging said members into driving contact one with another comprising, in combination, force transmitting lever means acting on said yieldable means through the intermediary of said driven clutch element, and a second lever operable upon said aforementioned lever, said levers having contactible lever arms of such contour and the levers being otherwise of such construction and arrangement that, to effect a complete clutch disengaging movement of said yieldable means, a uniform or substantially uniform force is required to operate said first-mentioned lever means during the first phase of the clutch disengaging operation of the yieldable means and a progressively diminishing force is required to operate said first-mentioned lever to complete the clutch disengaging movement of the yieldable means.

ADIEL Y. DODGE.